(12) United States Patent
Tsai

(10) Patent No.: US 12,275,333 B2
(45) Date of Patent: Apr. 15, 2025

(54) HUB STRUCTURE HAVING ANTI-LOCK BRAKING SYSTEM

(71) Applicant: JOY INDUSTRIAL (SHENZHEN) CO., LTD., Bao An Shen Zhen (CN)

(72) Inventor: Chien-Yuan Tsai, Bao An Shen Zhen (CN)

(73) Assignee: Joy Industrial (Shenzhen) Co., Ltd., Bao An Shen Zhen (CN)

( * ) Notice: Subject to any disclaimer, the term of this patent is extended or adjusted under 35 U.S.C. 154(b) by 785 days.

(21) Appl. No.: 17/491,882

(22) Filed: Oct. 1, 2021

(65) Prior Publication Data

US 2023/0109531 A1   Apr. 6, 2023

(51) Int. Cl.
| | |
|---|---|
| *B60L 7/28* | (2006.01) |
| *B60B 27/00* | (2006.01) |
| *B60L 7/24* | (2006.01) |
| *B62L 1/00* | (2006.01) |
| *H02K 49/04* | (2006.01) |

(52) U.S. Cl.
CPC ............ *B60L 7/28* (2013.01); *B60B 27/0047* (2013.01); *B62L 1/00* (2013.01); *H02K 49/046* (2013.01); *B60B 27/0052* (2013.01); *B60L 7/24* (2013.01)

(58) Field of Classification Search
CPC ..... B60L 7/28; B60L 7/24; B62L 1/00; B60B 27/0047; B60B 27/0052; H02K 49/046
See application file for complete search history.

(56) References Cited

U.S. PATENT DOCUMENTS

| | | | |
|---|---|---|---|
| 2003/0010584 A1* | 1/2003 | Chen | H02K 49/043 188/158 |
| 2018/0138795 A1* | 5/2018 | Imanishi | H02K 49/043 |
| 2019/0135115 A1* | 5/2019 | Savoie-Lavigueur | F16D 65/22 |

* cited by examiner

*Primary Examiner* — S. Joseph Morano
*Assistant Examiner* — Emily G. Castonguay
(74) *Attorney, Agent, or Firm* — Rosenberg, Klein & Lee

(57) ABSTRACT

A hub structure having an anti-lock braking system contains: a hub assembly and an anti-locking assembly. The hub assembly is located on a center of a wheel and includes a holder and a connection shaft. The anti-locking assembly is received in the holder and is fitted on the connection shaft, and the anti-locking assembly includes an anti-lock seat received in the holder and fitted on the connection shaft to rotate with the holder simultaneously, multiple eddy current elements arranged on two sides of the anti-lock seat and two ends of the connection shaft. A predetermined distance is defined between any two adjacent eddy current elements, and a respective eddy current element has at least one electromagnetic induction portion, when two corresponding electromagnetic induction portions are electrically conducted, a current magnetic field produces so that the anti-lock seat produces reverse currents to stop rotation.

9 Claims, 11 Drawing Sheets

HUB STRUCTURE HAVING ANTI-LOCK BRAKING SYSTEM

FIELD OF THE INVENTION

The present invention relates to a hub structure having an anti-lock braking system which is capable of producing eddy currents to stop the wheel gradually to avoid slide of the wheel when stopping the wheel suddenly.

BACKGROUND OF THE INVENTION

Braking systems, such as drum brakes, disc brakes, large vehicles or railway vehicles use hydraulic, air brake or electric brake to stop or slow down a wheel.

Auxiliary braking system, such as anti-lock braking system (ABS), traction control system (TCS), brake override system (BOS), hill-start assist control (HAC), and brake assist system can improve braking safety.

When driving on water, muddy ground, snow or sand, the ABS is applied to provide anti-lock to the wheel, thus avoiding car's instability.

The ABS is applicable for cars, motorcycles or bicycles, and a conventional brake system is connected with a handle, brake assembly or disc brake assembly so as to stop the wheel mechanically or hydraulically.

A conventional anti-lock braking mechanism of a bicycle is disclosed in Taiwan Patent Filing No. 107111808, and the conventional anti-lock braking mechanism is fixed on a hydraulic anti-lock brake system of a handle of a bicycle. Furthermore, a conventional braking device of a bicycle is disclosed in TW Utility Model No. 107207643 and is disposed on a hydraulic anti-lock braking system (ABS). Another anti-lock device is disclosed in TW Patent No. 106132420 and is mounted on a disc brake assembly so as to stop the wheel hydraulically and to be driven by electricity. Another conventional automatically adjustable braking device is arranged on a mechanical anti-lock braking system of a handle of a bicycle.

However, these conventional anti-lock braking systems contact with the wheel, thus damaging related components (such as a cable, a brake pad, a disc brake, or a brake clamper) easily. When stopping the wheel, these conventional anti-lock braking systems wear with the wheel to cause a high temperature. In addition, these conventional anti-lock braking systems are serially connected with the conventional brake systems, in case the conventional anti-lock braking systems are broken, the conventional brake systems are influenced to operate poorly. The conventional anti-lock braking systems expose outside an external environment to rust because of moistures, sands, and dusts.

The present invention has arisen to mitigate and/or obviate the afore-described disadvantages.

SUMMARY OF THE INVENTION

The primary aspect of the present invention is to provide a hub structure which contains the anti-locking assembly stopping but not contacting with the wheel by using eddy currents to avoid causing a high temperature and locking the ABS suddenly, thus reducing damage and abrasion in the high temperature.

Secondary aspect of the present invention is to provide a hub structure which contains the anti-locking assembly stopping but not contacting with the wheel by way of the multiple eddy current elements and the holder to avoid damage and abrasion and enhancing using life.

Further aspect of the present invention is to provide a hub structure which contains the anti-locking assembly and the conventional brake system arranged on the bicycle, so in case the anti-locking assembly is failed, the wheel is stopped by the conventional brake system, thus stopping the wheel safely.

Another aspect of the present invention is to provide a hub structure which contains anti-locking assembly received in the holder of the center of the wheel, so the holder does not expose outside the wheel to prevent rust effectively.

DETAILED DESCRIPTION OF THE PREFERRED EMBODIMENTS

Figure 1:
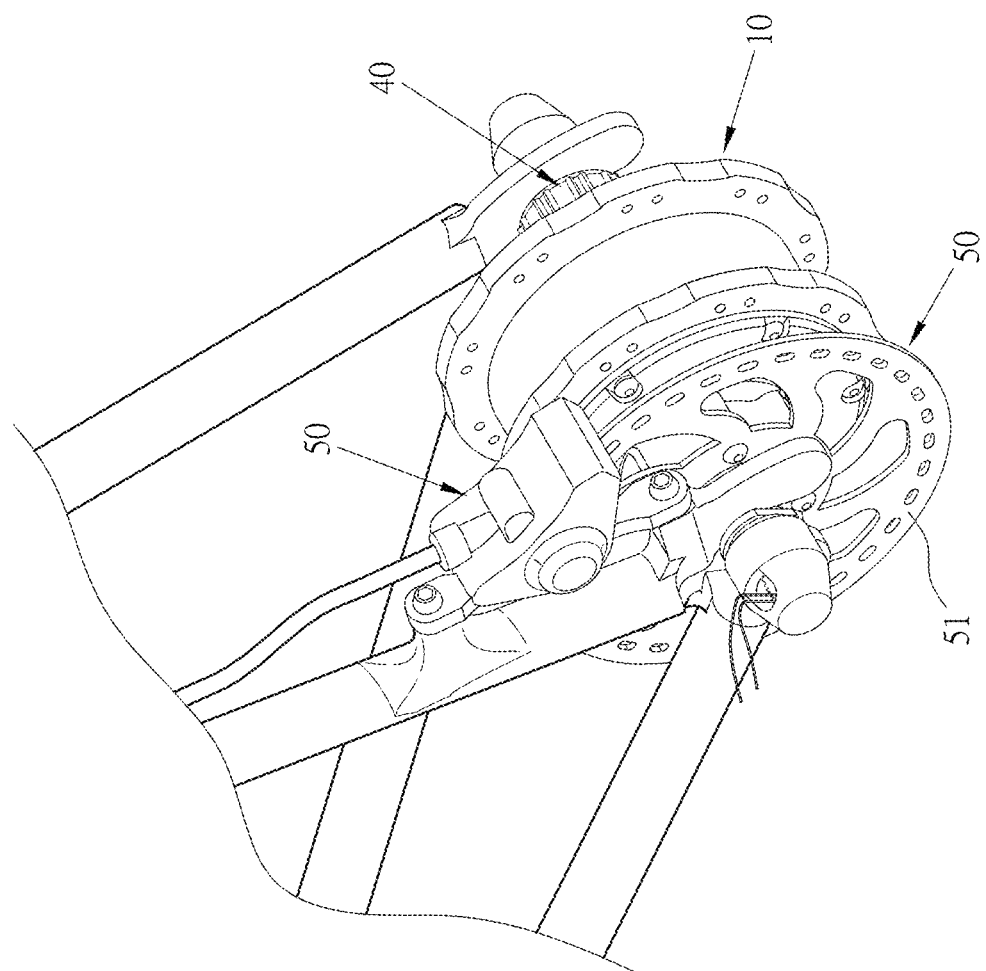
FIG. 1 is a perspective view showing the application of a hub structure having an anti-lock braking system according to a first embodiment of the present invention.
Figure 2:
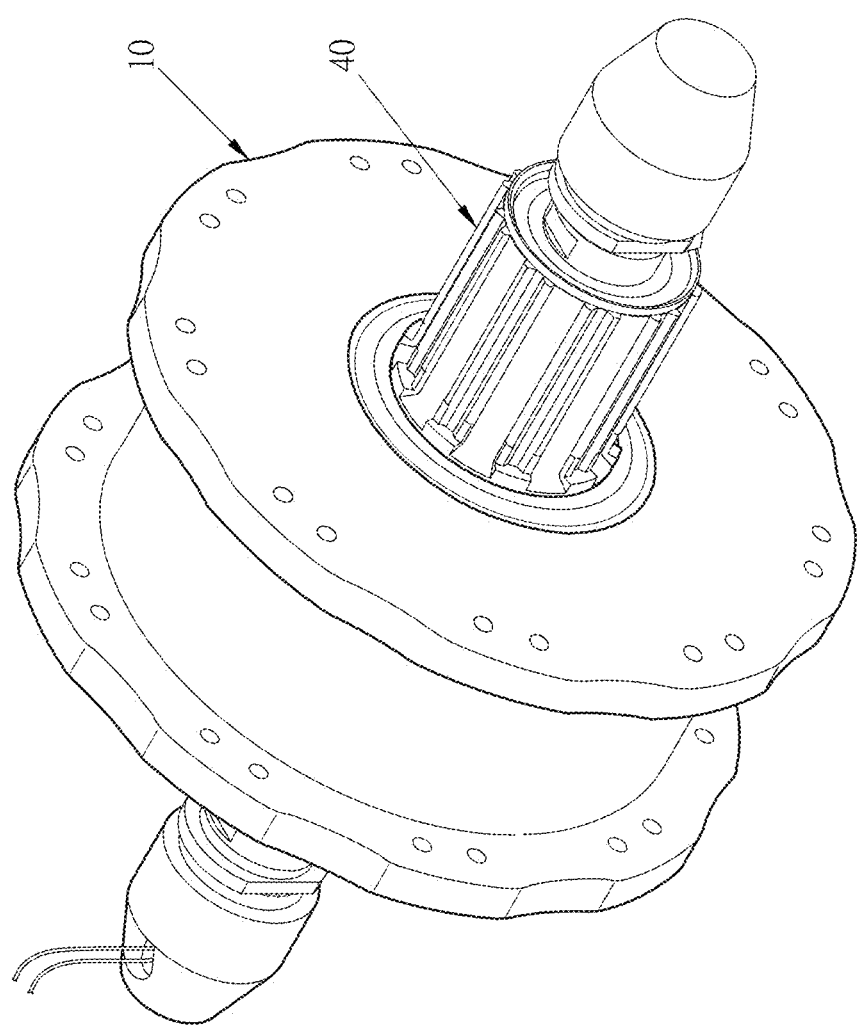
FIG. 2 is a perspective view showing the assembly of the hub structure having the anti-lock braking system according to the first embodiment of the present invention.
Figure 3:
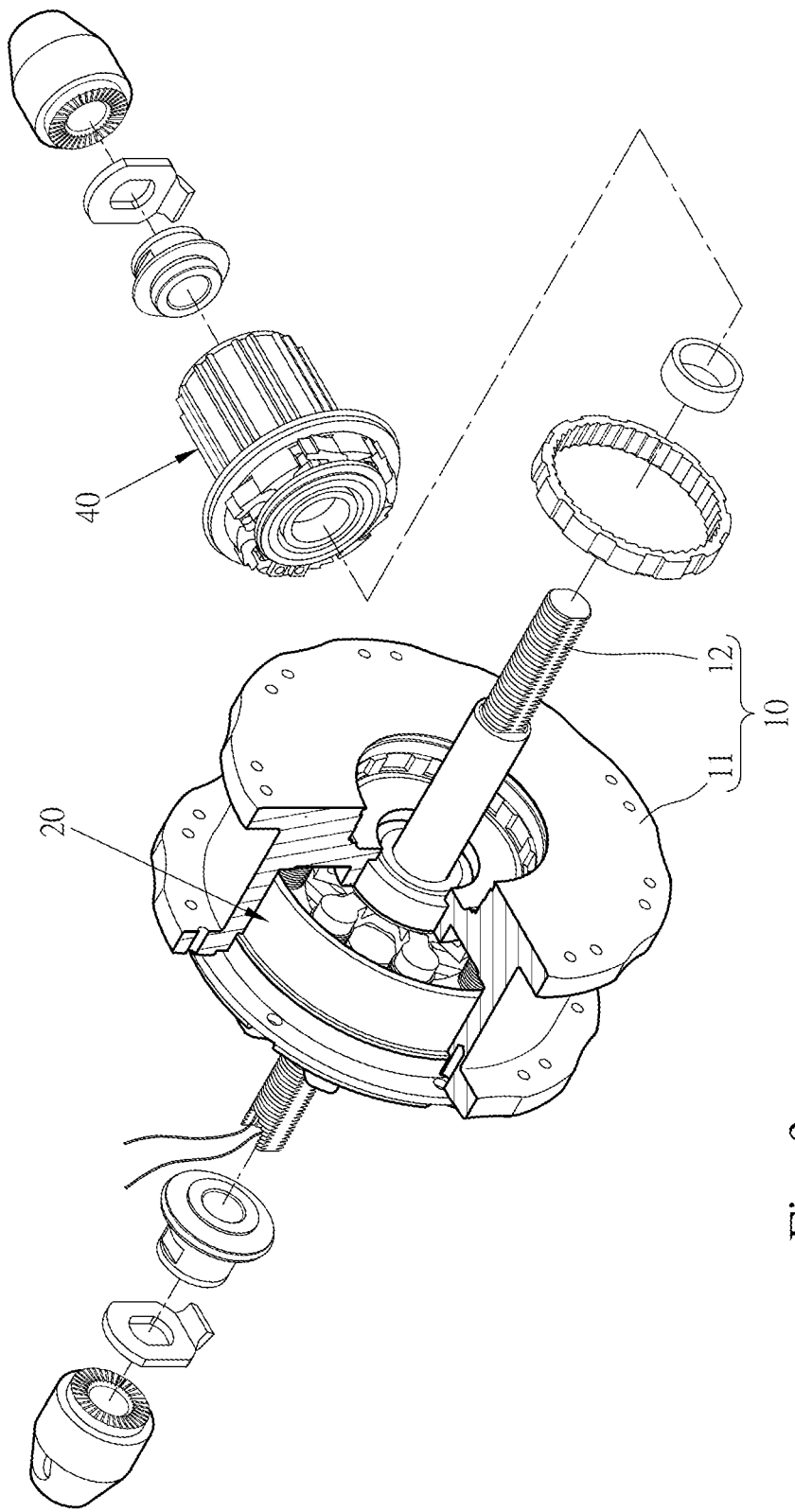
FIG. 3 is a cross-sectional perspective view showing the exploded components of the hub structure having the anti-lock braking system according to the first embodiment of the present invention.
Figure 4:
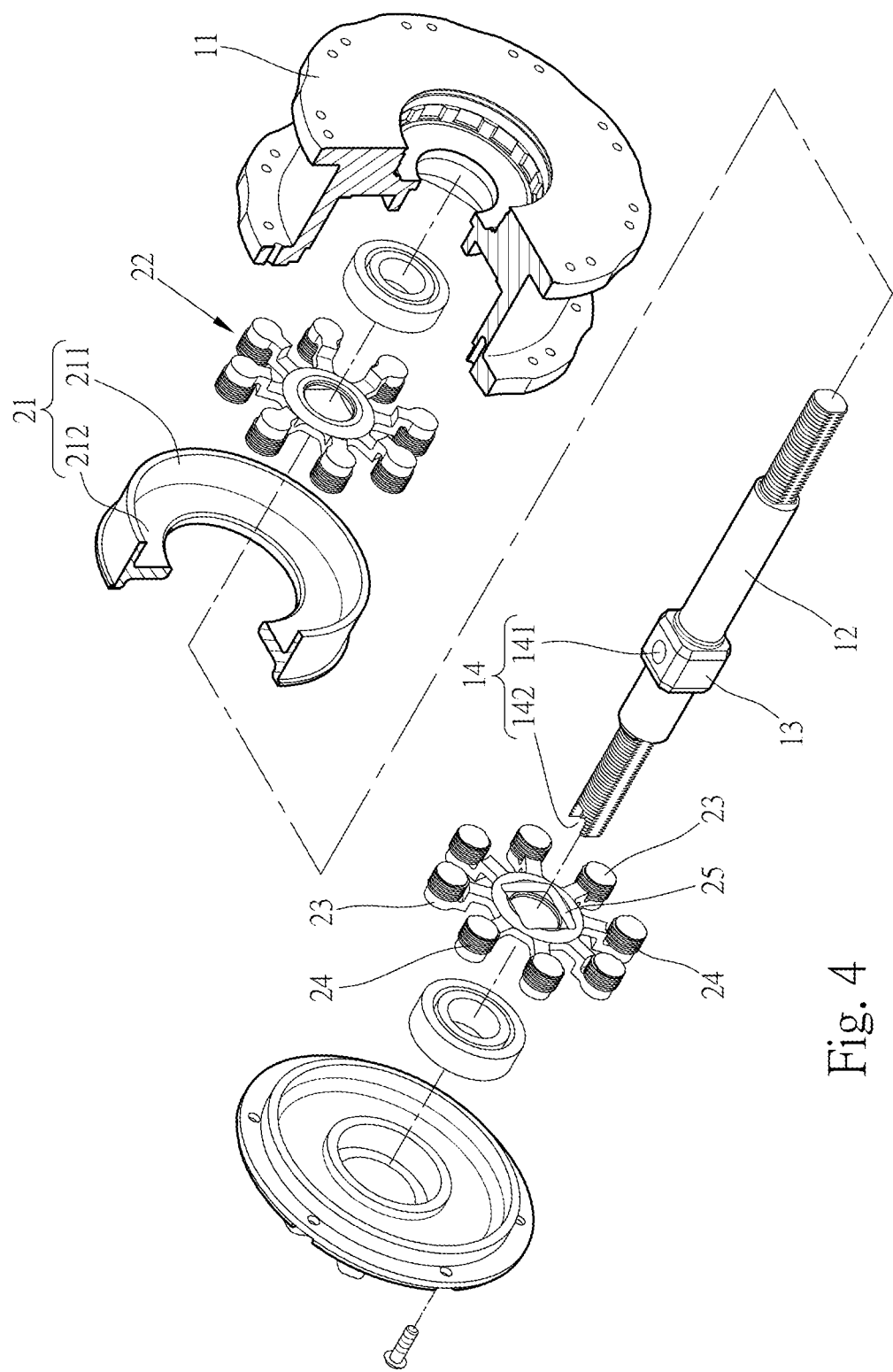
FIG. 4 is another cross-sectional perspective view showing the exploded components of the hub structure having the anti-lock braking system according to the first embodiment of the present invention.
Figure 5:
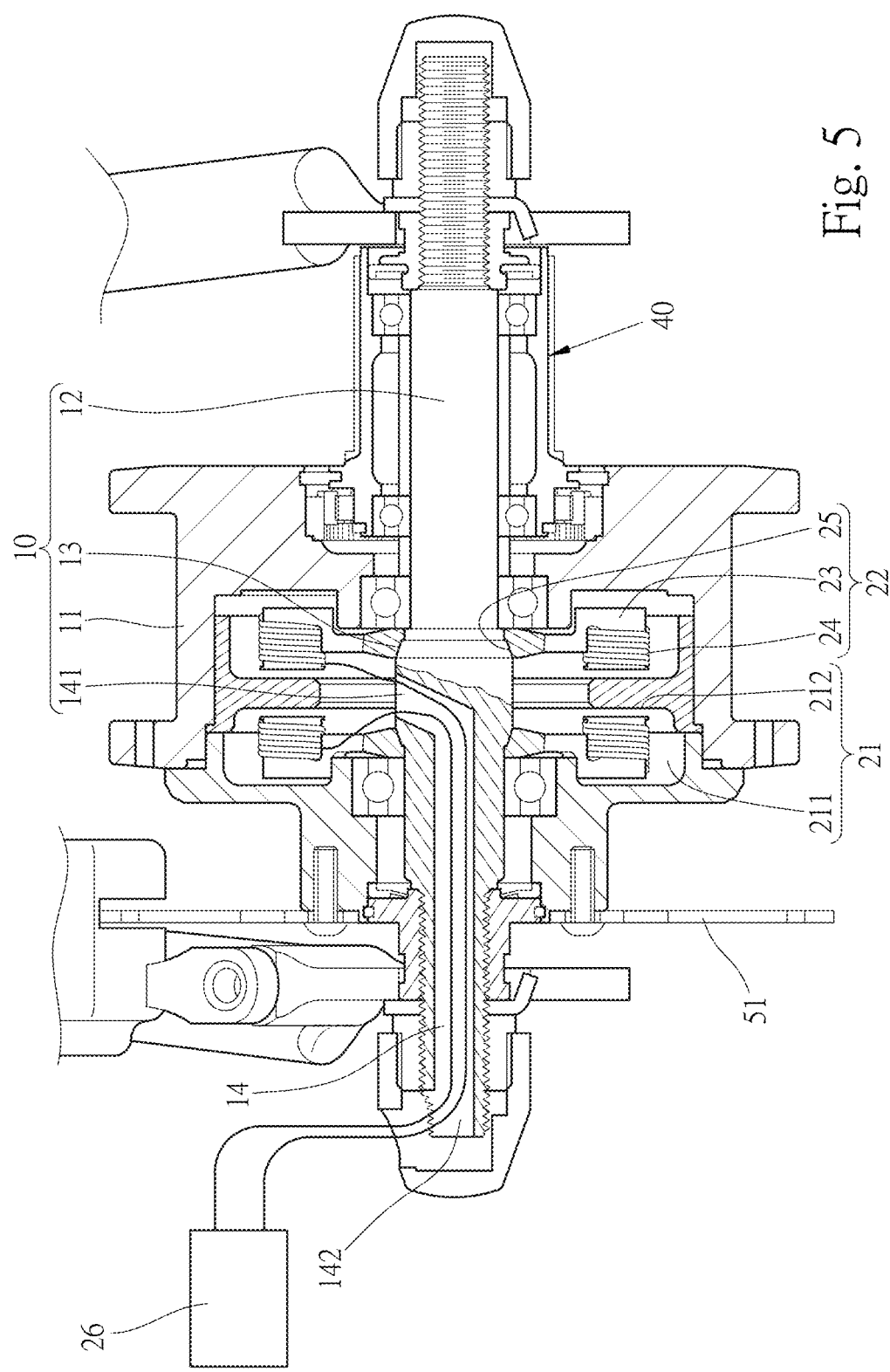
FIG. 5 is a cross sectional view showing the assembly of a part of the hub structure having the anti-lock braking system according to the first embodiment of the present invention.

With reference to FIGS. 1-6, a hub structure having an anti-lock braking system according to a first embodiment of the present invention comprises: a hub assembly 10 and an anti-locking assembly 20.

The hub system 10 is located on a center of a wheel and includes a holder 11, a connection shaft 12 inserted through the holder 11 so that the holder 11 rotates along the connection shaft 12, an engagement column 13 formed on a predetermined position of the connection shaft 12 in a quadrilateral shape, and a conduit 14 defined in and extending from a first portion 141 of the connection shaft 12 to a second portion 142 of the connection shaft 12.

The anti-locking assembly 20 is received in the holder 11 and is fitted on the connection shaft 12, and the anti-locking assembly 20 includes an anti-lock seat 21 received in the holder 11 and fitted on the connection shaft 12 to rotate with the holder 11 simultaneously, multiple eddy current elements 22 arranged on two sides of the anti-lock seat 21 and two ends of the connection shaft 12, wherein a predetermined distance is defined between any two adjacent eddy current elements 22, and a respective eddy current element 22 has at least one electromagnetic induction portion 23, when two corresponding electromagnetic induction portions 23 are electrically conducted, a current magnetic field produces so that the anti-lock seat 21 produces reverse currents to stop rotation, wherein the at least one electromagnetic induction portion 23 is cylindrical and is arranged around the multiple eddy current elements 22, a respective electromagnetic induction portion 23 has a coil 24 winded therearound, and the anti-lock seat 21 is fixed inside the holder 11. The anti-lock seat 21 includes two receiving chambers 211 defined in the two sides thereof so as to accommodate the respective eddy current element 22, and the anti-lock seat 21 includes two lower fringes 212 formed on two bottoms of the two receiving chambers 211 and configured to produce the reverse currents. The respective eddy current element 22 has a quadrilateral groove 25 formed on a predetermined position thereof so as to receive the engagement column 13. The first portion 141 of the connection shaft 12 and the engagement column 13 are connected with the multiple eddy current elements 22, the coil 24 is inserted from the first portion 141 of the connection shaft 12 to the second portion 142 of the connection shaft 12 via the conduit 14 so as to contact with an actuation assembly 26.

The holder 11 including a fitting sleeve 40 received on a first side thereof, rotating with the holder 11 simultaneously, and connected with a flywheel, and a disc brake 50 is accommodated in a second side of the holder 11, wherein the disc brake 50 has a braking disk 51 which rotates with the holder 11 simultaneously.

Thereby, the anti-locking assembly 20 stops the wheel by using eddy currents to avoid causing a high temperature and locking the ABS suddenly, thus reducing damage and abrasion and enhancing using life and security. Preferably, the holder 11 does not expose outside the wheel to prevent rust effectively.

In assembly, the coil 24 is winded around the respective electromagnetic induction portion 23, and the respective eddy current element 22 is accommodated in a respective receiving chamber 211 of the anti-lock seat 21. The connection shaft 12 is connected with the respective eddy current element 22, and the quadrilateral groove 25 of the respective eddy current element 22 is engaged with the engagement column 13, then the anti-lock seat 21, the respective eddy current element 22, and the connection shaft 11 is fixed in the holder 11, wherein an outer rim of the anti-lock seat 21 is positioned on an inner rim of the holder 11, the connection shaft 12 is inserted through a center of the holder 11. The coil 24 is inserted through the first portion 141 to the second portion 142 via the conduit 14 to contact with the actuation assembly 26 of a handle of the bicycle. Thereafter, the fitting sleeve 40 is received on the first side of the holder 11, the disc brake 50 is accommodated in the second side of the holder 11, and the two ends of the connection shaft 12 are mounted on a rear fork of the bicycle.

Figure 6:
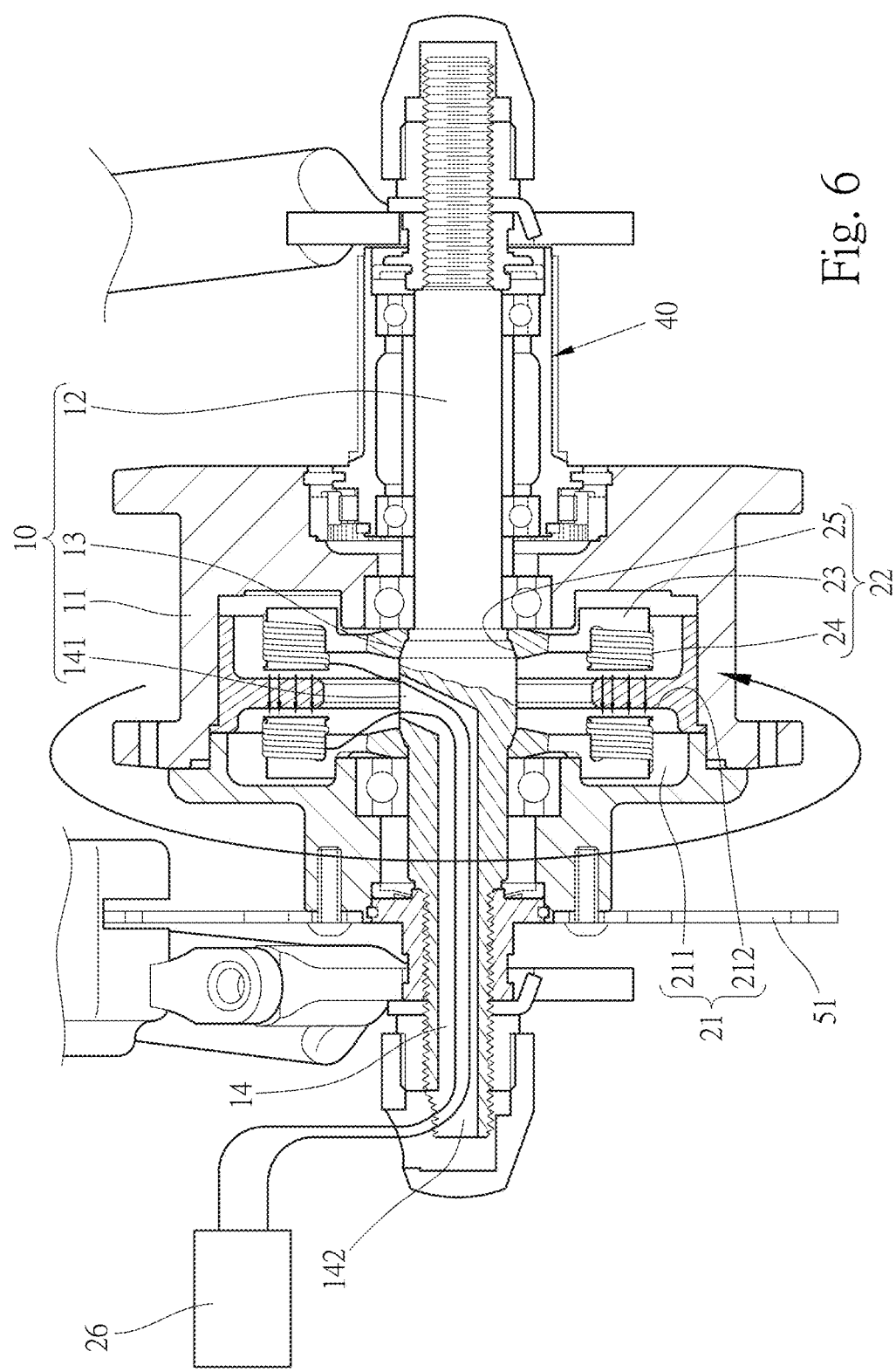
FIG. 6 is a cross sectional view showing the operation of the hub structure having the anti-lock braking system according to the first embodiment of the present invention.

As shown in FIG. 6, when the wheel and the holder 11 rotate simultaneously, the unit-lock seat 21 are driven by the holder 11 to rotate, and the braking disk 51 and the fitting sleeve 40 are revolved simultaneously. After stopping the wheel, the actuation assembly 26 is started so that the coil 24 is electrically conducted inside the anti-lock seat 21 to cause current induction, and reverse eddy currents produce on a respective lower fringe 212 between any two adjacent coils 24 of any two adjacent electromagnetic induction portions 23, such that when the respective lower fringe 212 of the anti-lock seat 21 rotates, different amperages are induced and different eddy currents produce on different positions of the anti-lock seat 21, thus stopping the wheel by changing magnetic flux.

The anti-locking assembly 20 is received in the holder 11 of the wheel, and the wheel is stopped by way of the multiple eddy current elements 22 safely, the unit-lock seat 21, at least one electromagnetic induction portion 23, and the coils 24.

Accordingly, the hub structure of the present invention has advantages as follows:

1. The anti-locking assembly 20 stops but not contact with the wheel by using eddy currents to avoid causing a high temperature and locking the ABS suddenly, thus reducing damage and abrasion in the high temperature.

2. The anti-locking assembly 20 stops but not contact with the wheel by way of the multiple eddy current elements 22 and the holder 21 to avoid damage and abrasion and enhancing using life.

3. The anti-locking assembly 20 stops but not contact with the wheel to eliminate calibration after the damage and the abrasion of the anti-locking assembly 20.

4. The anti-locking assembly 20 and the conventional brake system are arranged on the bicycle, so in case the anti-locking assembly 20 is failed, the wheel is stopped by the conventional brake system, thus stopping the wheel safely.

5. The anti-locking assembly 20 is received in the holder 11 of the center of the wheel, so the holder 11 does not expose outside the wheel to prevent rust effectively.

6. The anti-locking assembly 20 is simplified to be connected quickly and easily and is compact.

Figure 7:
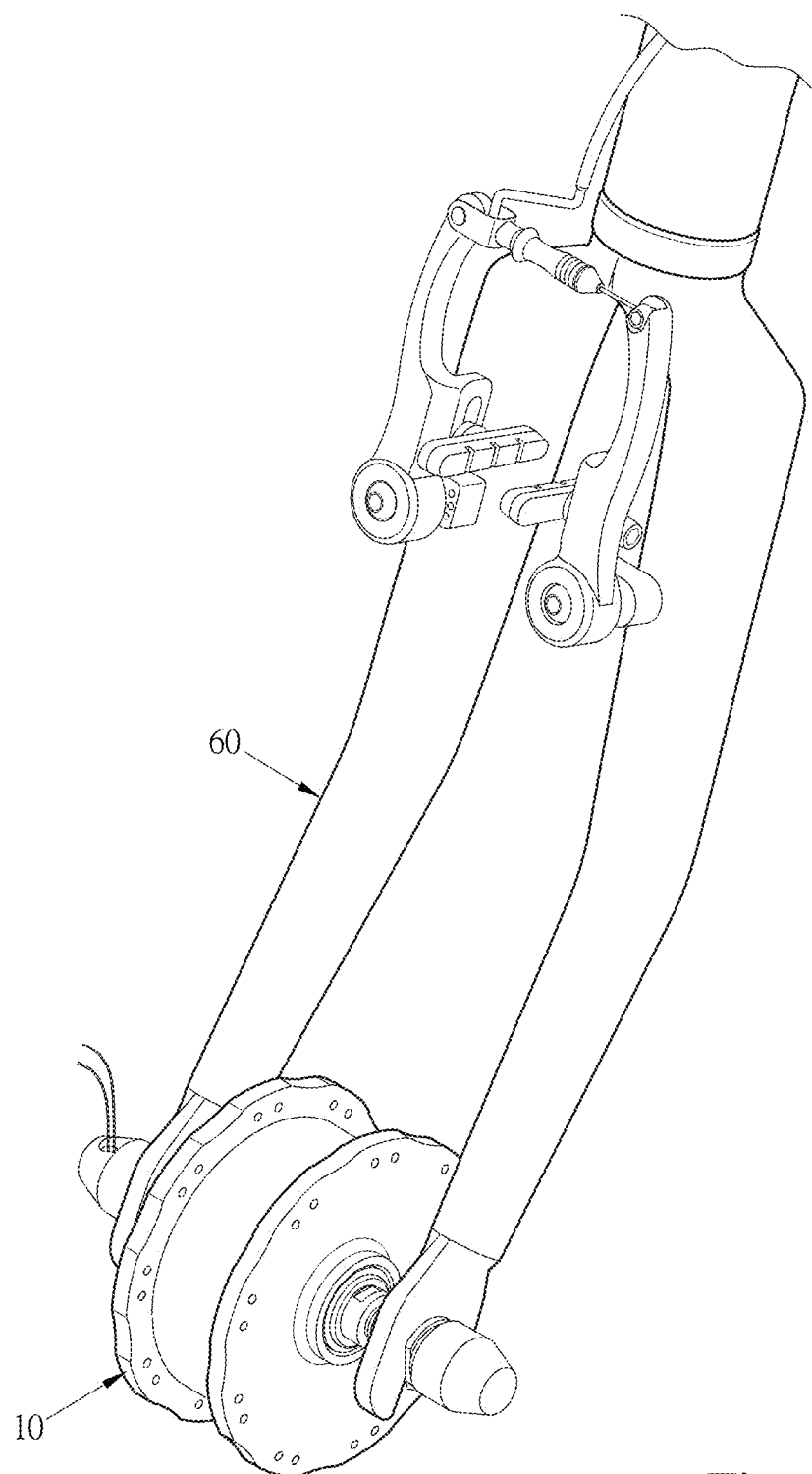
FIG. 7 is a perspective view showing the application of a hub structure having an anti-lock braking system according to a second embodiment of the present invention.
Figure 8:
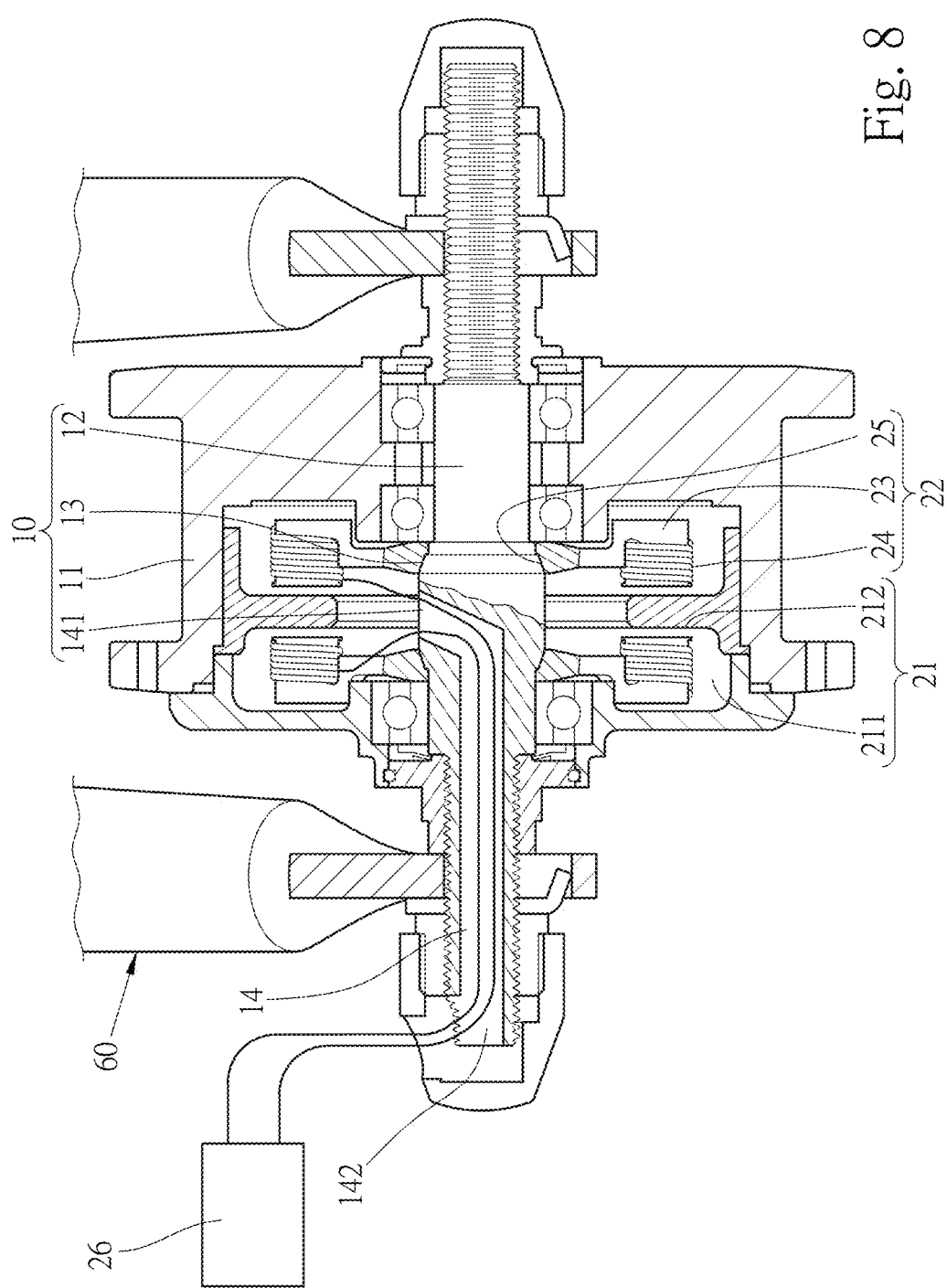
FIG. 8 is a cross sectional view showing the assembly of a part of the hub structure having the anti-lock braking system according to the second embodiment of the present invention.

With reference to FIGS. 7 and 8, a hub structure having an anti-lock braking system according to a second embodiment of the present invention is mounted on a front fork 60 of a bicycle and is applicable for the bicycle without the disc brake 50.

Figure 9:
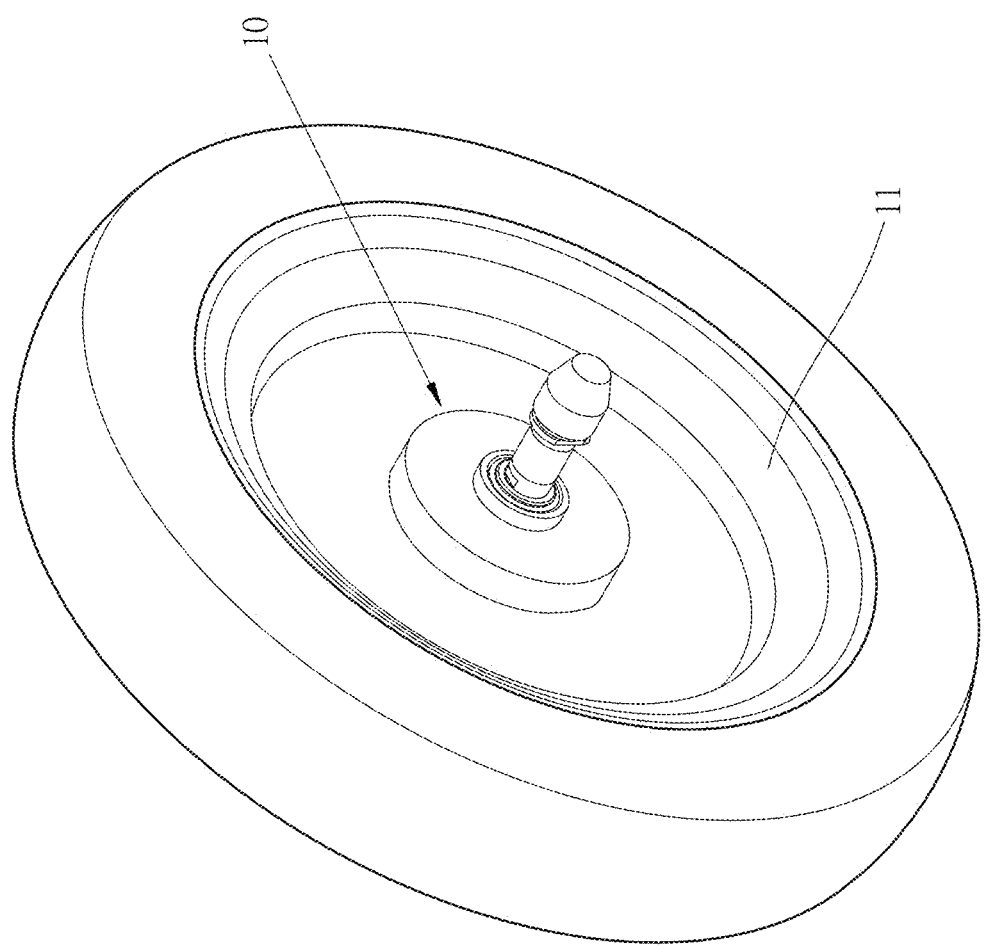
FIG. 9 is a perspective view showing the assembly of a hub structure having an anti-lock braking system according to a third embodiment of the present invention.
Figure 10:
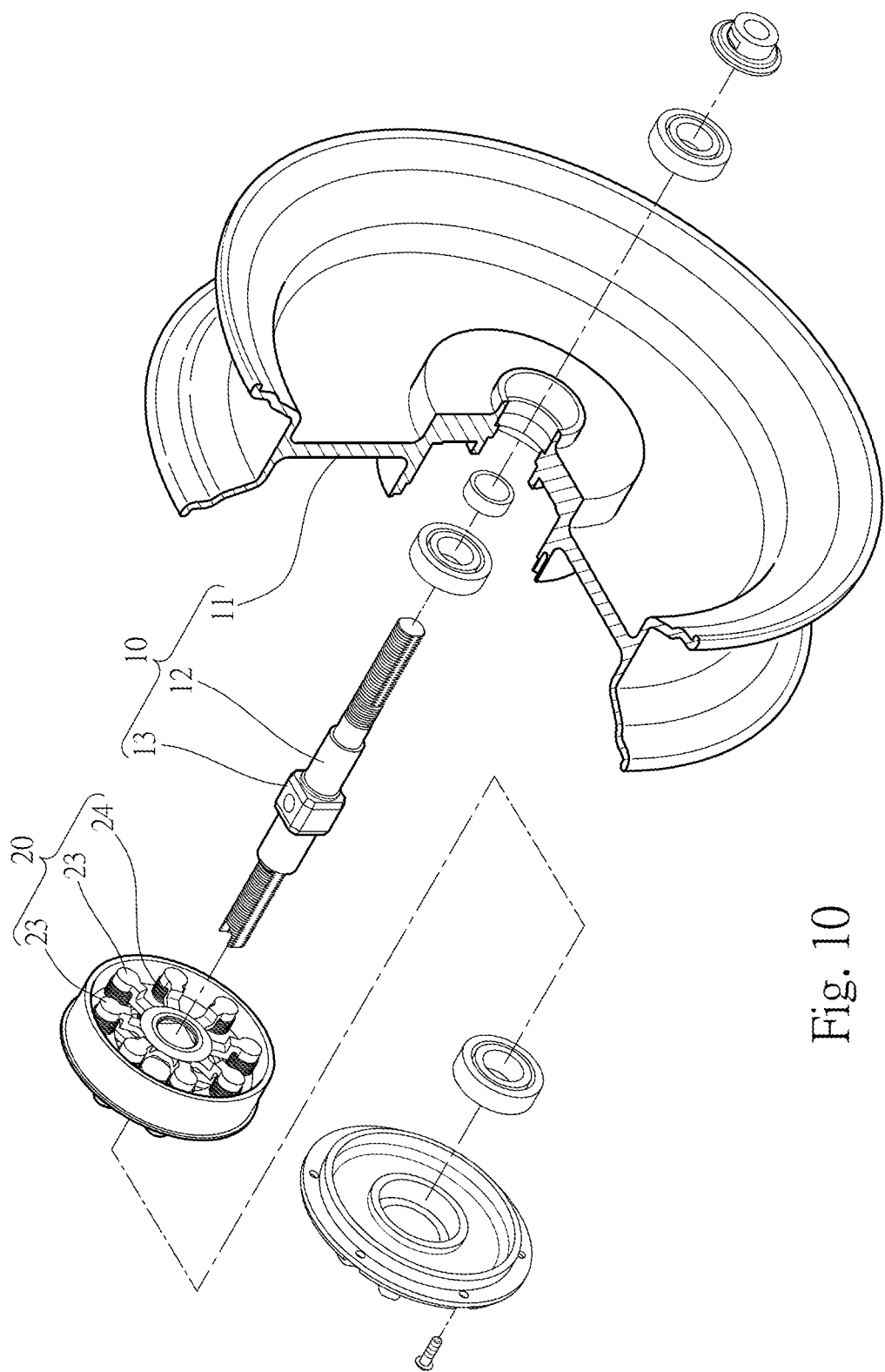
FIG. 10 is a cross-sectional perspective view showing the exploded components of the hub structure having the anti-lock braking system according to the third embodiment of the present invention.
Figure 11:
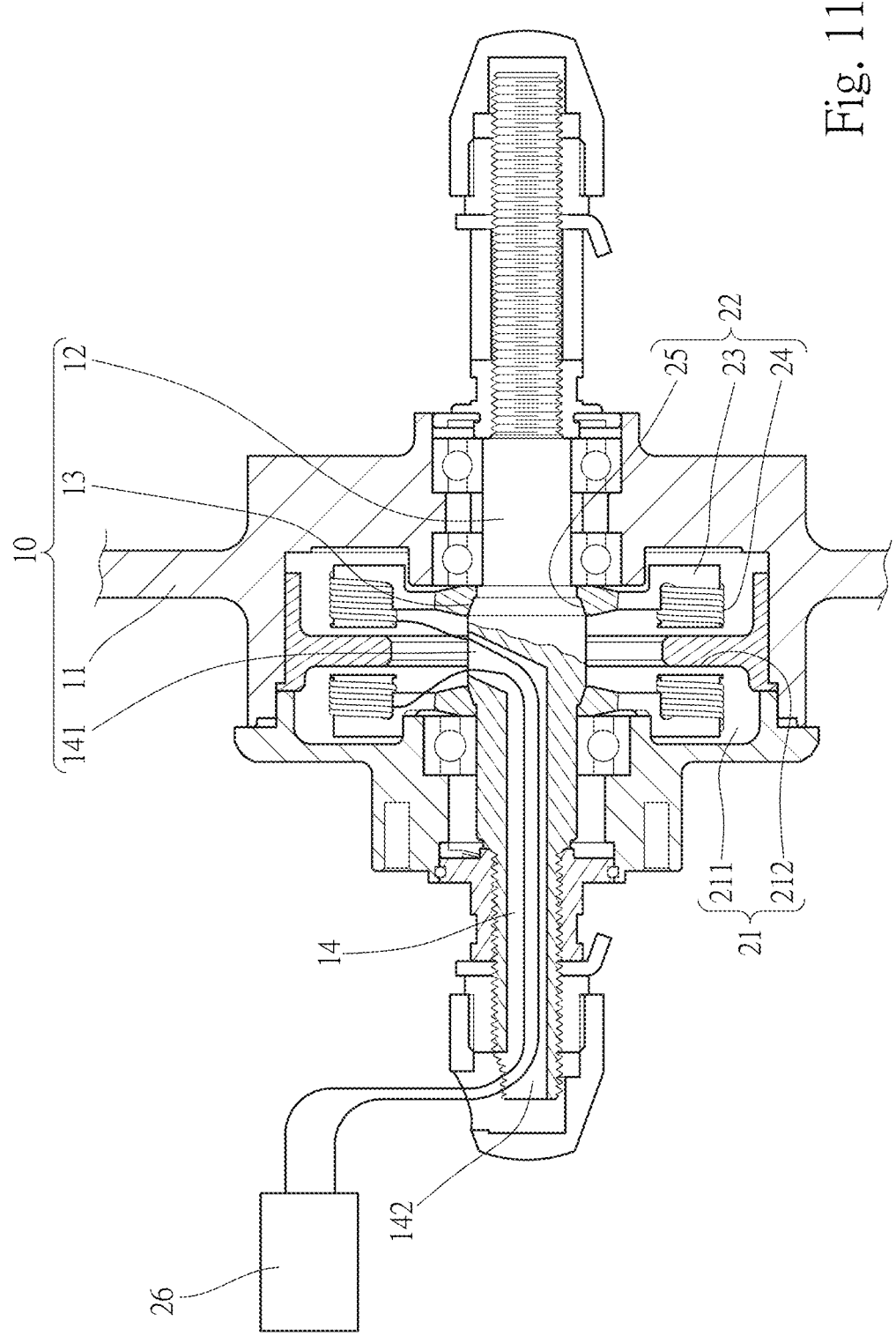
FIG. 11 is a cross sectional view showing the assembly of a part of the hub structure having the anti-lock braking system according to the third embodiment of the present invention.

Referring to FIGS. 9-11, a hub structure having an anti-lock braking system according to a third embodiment of the present invention is applicable for a motorcycle or an electric car, wherein the anti-locking assembly 20 is received in the holder 11.

While the preferred embodiments of the invention have been set forth for purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A hub structure having an anti-lock braking system comprising:
   a hub assembly located on a center of a wheel, and the hub assembly including a holder and a connection shaft inserted through the holder so that the holder rotates along the connection shaft; and an anti-locking assembly received in the holder and fitted on the connection shaft, and the anti-locking assembly including an anti-lock seat received in the holder and fitted on the connection shaft to rotate with the holder simultaneously, multiple eddy current elements arranged on two sides of the anti-lock seat and two ends of the connection shaft, wherein a predetermined distance is defined between any two adjacent eddy current elements, and a respective eddy current element has at least one electromagnetic induction portion, when two corresponding electromagnetic induction portions are electrically conducted, a current magnetic field produces so that the anti-lock seat produces reverse currents to stop rotation.

2. The hub structure as claimed in claim 1, wherein the at least one electromagnetic induction portion is arranged around the multiple eddy current elements, and a respective electromagnetic induction portion has a coil winded therearound.

3. The hub structure as claimed in claim 1, wherein the at least one electromagnetic induction portion is cylindrical, and a respective electromagnetic induction portion has a coil wound therearound.

4. The hub structure as claimed in claim 1, wherein an engagement column is formed on a predetermined position of the connection shaft in a quadrilateral shape, and the respective eddy current element has a quadrilateral groove formed on a predetermined position thereof so as to receive the engagement column.

5. The hub structure as claimed in claim 4, wherein a conduit is defined in and extending from a first portion of the connection shaft to a second portion of the connection shaft, the first portion of the connection shaft and the engagement column are connected with the multiple eddy current elements, and a respective electromagnetic induction portion has a coil winded therearound, wherein the coil is inserted from the first portion of the connection shaft to the second portion of the connection shaft via the conduit so as to contact with an actuation assembly.

6. The hub structure as claimed in claim 4, wherein a conduit is defined in and extending from a first portion of the connection shaft to a second portion of the connection shaft, the conduit passes from the first portion of the connection shaft to the second portion of the connection shaft, and a respective electromagnetic induction portion has a coil winded therearound, such that multiple coils are connected in the conduit and are extended out of the second portion of the connection shaft via the conduit so as to contact with an actuation assembly.

7. The hub structure as claimed in claim 1, wherein the holder includes a fitting sleeve received on a first side thereof, rotating with the holder simultaneously, and connected with a flywheel.

8. The hub structure as claimed in claim 1, wherein a disc brake is accommodated in a second side of the holder, and the disc brake has a braking disk which rotates with the holder simultaneously.

9. The hub structure as claimed in claim 1, wherein an outer rim of the anti-lock seat is positioned on an inner rim of the holder, the unit-lock seat includes two receiving chambers defined in the two sides thereof so as to accommodate the respective eddy current element, and the unit-lock seat includes two lower fringes formed on two bottoms of the two receiving chambers and configured to produce the reverse currents.

\* \* \* \* \*